US006843116B2

(12) United States Patent
Mitani et al.

(10) Patent No.: US 6,843,116 B2
(45) Date of Patent: Jan. 18, 2005

(54) FUEL PUMP MODULE AND VEHICLE RESIDUAL FUEL DETECTOR

(75) Inventors: Tateki Mitani, Tokyo (JP); Hiroshi Yoshioka, Tokyo (JP); Michihiro Hayashi, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 10/396,581

(22) Filed: Mar. 26, 2003

(65) Prior Publication Data

US 2004/0065147 A1 Apr. 8, 2004

(30) Foreign Application Priority Data

Oct. 7, 2002 (JP) .................................... P. 2002-293315

(51) Int. Cl.[7] ................................................ G01F 17/00
(52) U.S. Cl. ........................................................ 73/149
(58) Field of Search ......................... 73/149, 299, 49.7, 73/49.2, 290 B, 290 R, 303

(56) References Cited

U.S. PATENT DOCUMENTS 5,189,500 A 2/1993 Kusunoki
5,245,870 A * 9/1993 Hartel et al. .................. 73/149
5,338,549 A 8/1994 Hord et al.
6,065,452 A 5/2000 Yoshioka
6,260,540 B1 7/2001 Hiraiwa et al.

* cited by examiner

*Primary Examiner*—Hezron Williams
*Assistant Examiner*—Rodney T. Frank
(74) *Attorney, Agent, or Firm*—Sughrue Mion, PLLC

(57) ABSTRACT

A fuel pump module is liquid-tightly mounted in an opening of a vehicle fuel tank. The fuel pump module includes a residual fuel detector provided near the fuel tank. The residual fuel detector includes a diaphragm having a first diaphragm for receiving fuel pressure Pg by a head and atmospheric pressure Po, and a diaphragm portion for receiving atmospheric pressure Po and internal pressure Pi. The residual fuel detector detects the amount of fuel remaining in the fuel tank on the basis of these kinds of pressure Po, Pg and Pi. At the same time, the residual fuel detector detects the in-tank pressure Pt of the fuel tank on the basis of Po and Pi.

12 Claims, 4 Drawing Sheets

FUEL PUMP MODULE AND VEHICLE RESIDUAL FUEL DETECTOR

BACKGROUND OF THE INVENTION

1. Field of the Invention

The present invention relates to a fuel pump module mounted in a fuel tank, which stores fuel, and for mainly supplying the fuel stored in the fuel tank into an internal combustion engine and particularly to a fuel pump module for detecting the residual amount of fuel in a fuel tank. The invention also relates to a vehicle residual fuel detector for detecting the residual amount of fuel in a fuel tank.

2. Description of the Related Art

A fuel pump module according to a related art is formed in such a manner that a mount bracket for mounting the fuel pump module on a fuel tank is attached to a pump portion with a filter in which a fuel pump and a fuel filter are integrated. In the fuel pump module, a sender gauge is attached to the mount bracket. The sender gauge has a detecting portion formed of a variable resistor, a float portion, and an arm portion extended from the detecting portion and connected to the float portion (e.g., see patent literature 1).

On the other hand, a pressure sensor is provided in a mount bracket for mounting a fuel pump in a fuel tank so that the pressure sensor can be mounted easily (e.g., see patent literature 2).

[Patent Literature 1]

JP-A-Hei.11-294283 (pages 3 to 4 and FIGS. 1 and 2).

[Patent Literature 2]

JP-A-Hei.4-325316 (page 3 and FIGS. 2 to 5).

Since the sender gauge in the related art is of a float type, a rotation radius of the arm corresponding to the depth of the tank is required so that the fuel pump module becomes large structurally. Moreover, the shapes of the arm portion and the float portion adjusted in accordance with the shape of the tank are complex. For this reason, the operation of assembling the fuel pump module is complicated and a large returnable box is required for transporting the fuel pump module. Moreover, much labor and time is required for incorporating the fuel pump module into the fuel tank.

In addition, a connector for sending/receiving signals to/from the outside of the in-tank pressure sensor is required independently. For this reason, the place for attaching the fuel pump module is limited as well as much labor is required for attaching the fuel pump module into the fuel tank.

SUMMARY OF THE INVENTION

The invention is developed to solve the above problems. An object of the invention is to provide a fuel pump module and a vehicle residual fuel detector, which are structurally small and little limited in attachment into a fuel tank.

According to the invention, there is provided a fuel pump module including a bracket, a fuel pump, and a residual fuel detector. The bracket closes an opening of a vehicle fuel tank, which stores fuel. The fuel pump is held in the bracket for sending out the fuel stored in the fuel tank. The residual fuel detector receives by a diaphragm external pressure Po of the fuel tank, internal pressure Pi of an air chamber of the fuel tank and fuel pressure Pg of the fuel from the bracket to detect an amount of fuel remaining in the fuel tank.

According to the invention, there is provided a vehicle residual fuel detector disposed on a bottom portion of a vehicle fuel tank, which stores fuel. The vehicle residual fuel detector includes a diaphragm. The diaphragm receives external pressure Po of the fuel tank, internal pressure Pi of an air chamber of the fuel tank and fuel pressure Pg of the fuel to detect an amount of fuel remaining in the fuel tank and internal pressure of the fuel tank.

DETAILED DESCRIPTION OF THE PREFERRED EMBODIMENTS

Embodiment 1

Figure 1:
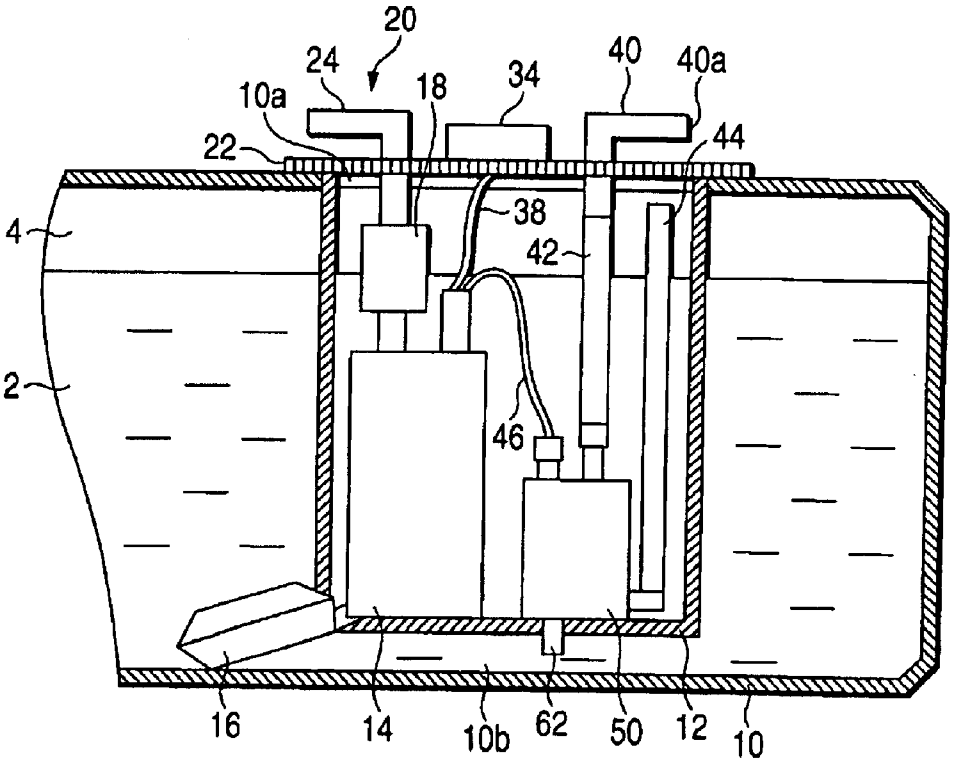
FIG. 1 is a partly sectional view showing a state in which a fuel pump module according to Embodiment 1 of the invention is mounted in a vehicle fuel tank.
Figure 2:
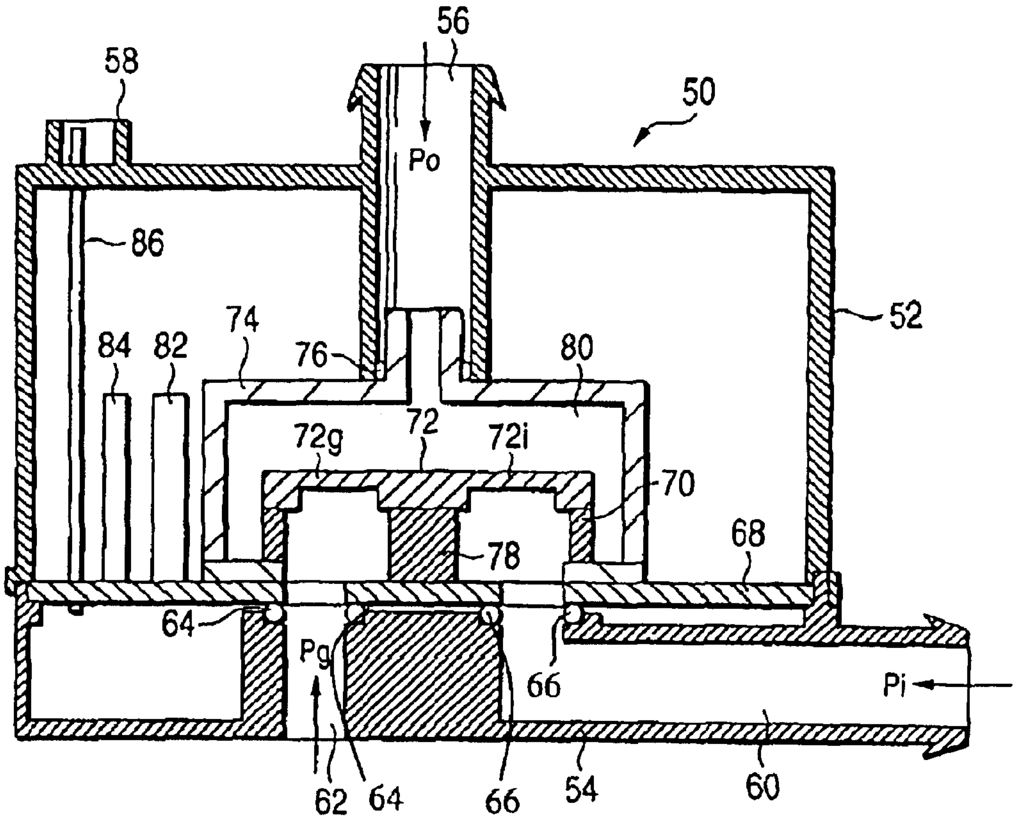
FIG. 2 is a sectional view of a residual fuel detector depicted in FIG. 1.

Embodiment 1 of the invention will be described below. FIG. 1 is a partly sectional view showing a state in which a fuel pump module according to Embodiment 1 of the invention is mounted in a vehicle fuel tank. FIG. 2 is a sectional view of a residual fuel detector depicted in FIG. 1. The residual fuel detector is shown largely for the sake of convenience of description.

Referring to FIG. 1, a fuel pump module 20 is liquid-tightly mounted in an opening 10*a* of a vehicle fuel tank 10, which stores fuel such as gasoline, through a gasket not shown. The fuel pump module 20 has a fuel pump 14 for pressurizing the fuel stored in the fuel tank 10 by its pumping action. When the fuel pump 14 is actuated, fuel 2 is sucked through a suction filter 16. The fuel pressurized by the pumping action passes through the inside of the fuel pump 14 and further passes through a high-pressure filter 18 from an outlet of the fuel pump while dust or the like is filtered off by the high-pressure filter 18. Then, the fuel is delivered, through a fuel pipe 24 provided in a bracket 22, to an injector for jetting fuel into an internal combustion engine not shown. A pressure regulator not shown but for keeping the pressure of the fuel pressurized by the fuel pump 14 constant may be further provided on an outlet side of the high-pressure filter 18.

The fuel pump 14 and a residual fuel detector 50 are held and fixed in a holding member 12 in proximity to a bottom portion 10*b* of the fuel tank 10. The holding member 12 is shaped like a cup and fixed to the bracket 22. The bracket 22 is provided with a connector 34 connected to an external signal processing circuit and an external power supply circuit not shown. A lead wire 38 for supplying electricity to the fuel pump 14 from the inside of the fuel tank 10, and a lead wire 46 including a power supply line and a signal line of the residual fuel detector 50 are connected to the connector 34. Although FIG. 1 shows a case where the lead wire 46 is tied with the lead wire 38 into a bundle at an upper portion of the fuel pump 14, the lead wire 46 may be connected to the connector 34 while being separated from the lead wire 38. The connector 34 may be separated into two parts for the lead wire 38 of the fuel pump 14 and for the residual fuel detector 50. An L-shaped external air intake pipe 40 for taking in air from the outside of the fuel tank 10 is provided in the bracket 22. A fluorine-based filter 40*a* permeable to gas but impermeable to liquid is gas-tightly provided on an end surface of the external air intake pipe 40.

Referring to FIGS. 1 and 2, the residual fuel detector 50 has a closed container, which is made of an electrically insulating resin such as polyacetal and constituted by a combination of a cover 52 and a base 54. A diaphragm 72, a circuit portion 82, a circuit protecting portion 84, etc. are disposed in the closed container. An external pressure lead-in portion (nipple) 56 and a connector 58 are provided in the cover 52. An external pressure lead-in pipe 42 gas-tightly connected to the external air intake pipe 40 in the fuel tank 10 is gas-tightly connected to the external pressure lead-in portion 56. A connector of the lead wire 46 is joined to the connector 58.

An internal pressure lead-in portion (nipple) 60 and a fuel pressure lead-in portion 62 are provided in the base 54. An internal pressure lead-in pipe 44 for leading the internal pressure Pi of an air chamber 4 of the fuel tank 10 is gas-tightly connected to the internal pressure lead-in portion (nipple) 60. The fuel pressure lead-in portion 62 leads the pressure of the fuel 2 of the fuel tank 10.

The external pressure lead-in pipe 42 and the external air intake pipe 40 may be integrated with each other. Any material such as metal, rubber or resin molding may be used as the material of each of the external pressure lead-in pipe 42 and the internal pressure lead-in pipe 44. When a resin molding is used as the material of the holding member 12, at least one of the external pressure lead-in pipe 42 and the internal pressure lead-in pipe 44 may be integrated with the holding member 12. When a resin molding is used as the material of the bracket 22, the external pressure lead-in pipe 42 may be molded integrally with the bracket 22.

A diaphragm 72 has two diaphragm sections, that is, a first diaphragm section 72*g* and a second diaphragm section 72*i* and receives three kinds of pressure Po, Pg and Pi. The diaphragm 72 is bonded and fixed both to a stem 70 and to a pedestal 78. The diaphragm 72 is separated into three chambers gas-tightly by a cap 74, the pedestal 78 and the stem 70 supporting these diaphragm portions. External pressure Po is applied to a reference pressure chamber 80 abutting against a not-shown gauge resistance surface (a front surface side) of the diaphragm 72.

Internal pressure P1 and fuel pressure Pg are applied to a rear surface of the diaphragm 72 opposite to the gauge resistance surface. Since the diaphragm 72 is constituted by one chip, the diaphragm 72 has uniform characteristic and can be corrected easily even in the case where the diaphragm 72 is a semiconductor diaphragm having many variations in temperature characteristic.

In Embodiment 1, in order to obtain accurate temperature correction, a temperature sensor (though not shown) such as a thermistor may be preferably provided in the residual fuel detector 50 to thereby correct the residual amount Ph of fuel.

The circuit portion 82, the circuit protecting portion 84, electrically conductive terminals 86, the stem 70, and the pedestal 78 are fixed to a ceramic board 68. The circuit portion 82 processes a signal generated from the diaphragm 72. The circuit protecting portion 84 protects the circuit from an electric surge. The electrically conductive terminals 86 are electrically connected to the circuit portion 82 or the circuit protecting portion 84 and are insert-molded in the connector 58.

When the circuit portion 82 is formed of C-MOS, a circuit protecting portion 84 constituted by a bipolar system may be preferably provided for electrical protection.

Next, assembling of the residual fuel detector 50 will be described. After the stem 70, the diaphragm 72, the cap 74, the circuit portion 82, and the circuit protecting portion 84 are fixed to and electrically connected to the board 68, the external pressure lead-in portion 56 of the cover 52 is gas-tightly press-fitted to the cap 74 through an O-ring 76. Then, the terminals 86 are electrically connected to the circuit portion 82 and/or the circuit protecting portion 84. Then, in a condition that O-rings 64 and 66 are disposed in predetermined positions of the base 54, the base 54 is welded to the board 68 and the cover 52. In this manner, the diaphragm 72 is separated into three chambers gas-tightly.

Next, an operation will be described.

The internal pressure Pi, which is the pressure of the air chamber 4, is led to the rear surface side of the diaphragm 72*i*. The fuel pressure Pg by a fuel head is led to the rear surface side of the diaphragm 72*g*. On the other hand, the external pressure Po, which is the pressure of air given from the external air intake pipe 40, is led in common to both the front surface side of the diaphragm 72*i* and the front surface side of the diaphragm 72*g*. When the diaphragm 72 is constituted by a semiconductor chip, it is preferable that air and pressure medium are led in the following manner. Relatively clean air is led onto the front surface side, which is apt to be damaged by various kinds of contaminants because a semiconductor circuit is formed on the front surface side in a semiconductor process. On the other hand, a pressure medium apt to be contaminated such as the fuel 2, which is gasoline or the like, and air in the fuel chamber 4 is applied to the rear surface side, which is tolerant to contamination because no circuit using semiconductor is formed on the rear surface side.

For example, two Wheatstone bridges are formed on the diaphragm 72. Required in-tank pressure Pt and residual amount Ph of fuel can be obtained on the basis of differential amplification or subtraction by the circuit portion 82 of the following step with respect to outputs of the two Wheatstone bridges.

With this configuration, the in-tank pressure Pt can be expressed as the difference between the external pressure Po and the internal pressure Pi ($Pt=Pi-Po$), pressure difference Px can be expressed as the difference between the fuel pressure Pg and the external pressure Po ($Px=Pg-Po$), and the residual amount Ph of fuel can be expressed as the difference between the fuel pressure Pg by the fuel head and the internal pressure Pi ($Ph=Pg-Pi$). Hence, the residual amount Ph of fuel can be obtained by subtraction of pressure difference Pt acting on the diaphragm 72*i* from pressure difference Px acting on the diaphragm 72*g* ($Ph=Px-Pt=Pg-Pi$).

As described above, the residual fuel detector 50 can further detect the internal pressure of the fuel tank 10 on the basis of the output of the diaphragm 72*i*.

Incidentally, air leakage of a fuel supply system is measured on the basis of the change of internal pressure of an in-tank pressure sensor in the condition that the fuel supply system is entirely closed when the vehicle is in a predetermined driving mode. The in-tank pressure sensor has the role of giving a warning to a vehicle driver, for example, by switching on a lamp not shown when a predetermined amount of leaked air is detected.

With the above-described configuration, the residual amount Ph of fuel and the in-tank pressure Pt can be detected concurrently. Moreover, since there is no float type rotating portion, the size of the fuel pump module 20 itself can be reduced as well as the region occupied by the residual fuel detector 50 is small.

Moreover, since the semiconductor diaphragm 72 is used, the residual fuel detector 50 can be constituted by several monolithic ICs as a whole. Hence, reduction in size and cost can be attained. Moreover, since the semiconductor diaphragm 72 is constituted by one chip having two diaphragms, stable characteristic can be obtained against variation in temperature characteristic.

In addition, the connector 34 is used in common to the bracket 22 of the fuel pump module 20 and three kinds of pressure Pg, Pi and Po used for calculating the residual amount Ph of fuel and the in-tank pressure Pt are received in the fuel tank 10. Hence, seals, which are required high machining accuracy, and sealing parts therefor can be reduced in number compared with a case where the in-tank pressure sensor is provided separately.

Although description has been made upon the case where semiconductor is used as the diaphragm 72, the same effect as described above can be obtained also in the case where metal, ceramics or the like is used as the diaphragm 72.

Although description has been made upon the case where the pressure sensor is of a resistance type using semiconductor gauge resistance, the same effect as described above can be obtained also in the case where the pressure sensor is of a capacitance type.

Moreover, the same effect as described above can be obtained even without provision of any circuit protecting portion 84 if the circuit portion 82 is of a bipolar type.

In addition, the same effect as described above can be obtained also in the case where at least two selected from the circuit protecting portion 84, the diaphragm 72 and the circuit portion 82 are placed on one chip.

Incidentally, description has been described upon a system condition example in which all systems from the fuel tank 10 to the internal combustion engine are closed while the vehicle is being driven in order to detect in-tank pressure, that is, the residual amount Ph of fuel is obtained on the basis of the difference between the fuel pressure Pg and the internal pressure Pi. In a system condition example in which the fuel tank 10 is opened to external air while the vehicle is not driven, that is, the internal pressure Pi is equal to the external pressure Po, the residual amount Ph of fuel can be obtained by subtraction of the external pressure Po from the fuel pressure Pg.

Embodiment 2

Figure 3:
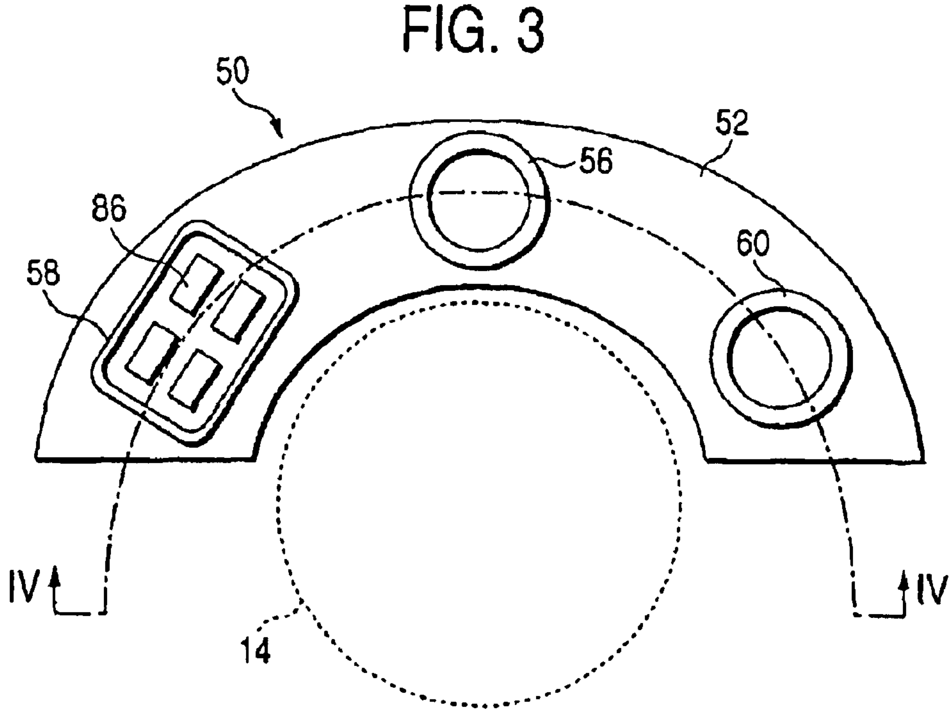
FIG. 3 is a top view of a residual fuel detector in a fuel pump module according to Embodiment 2 of the invention.
Figure 4:
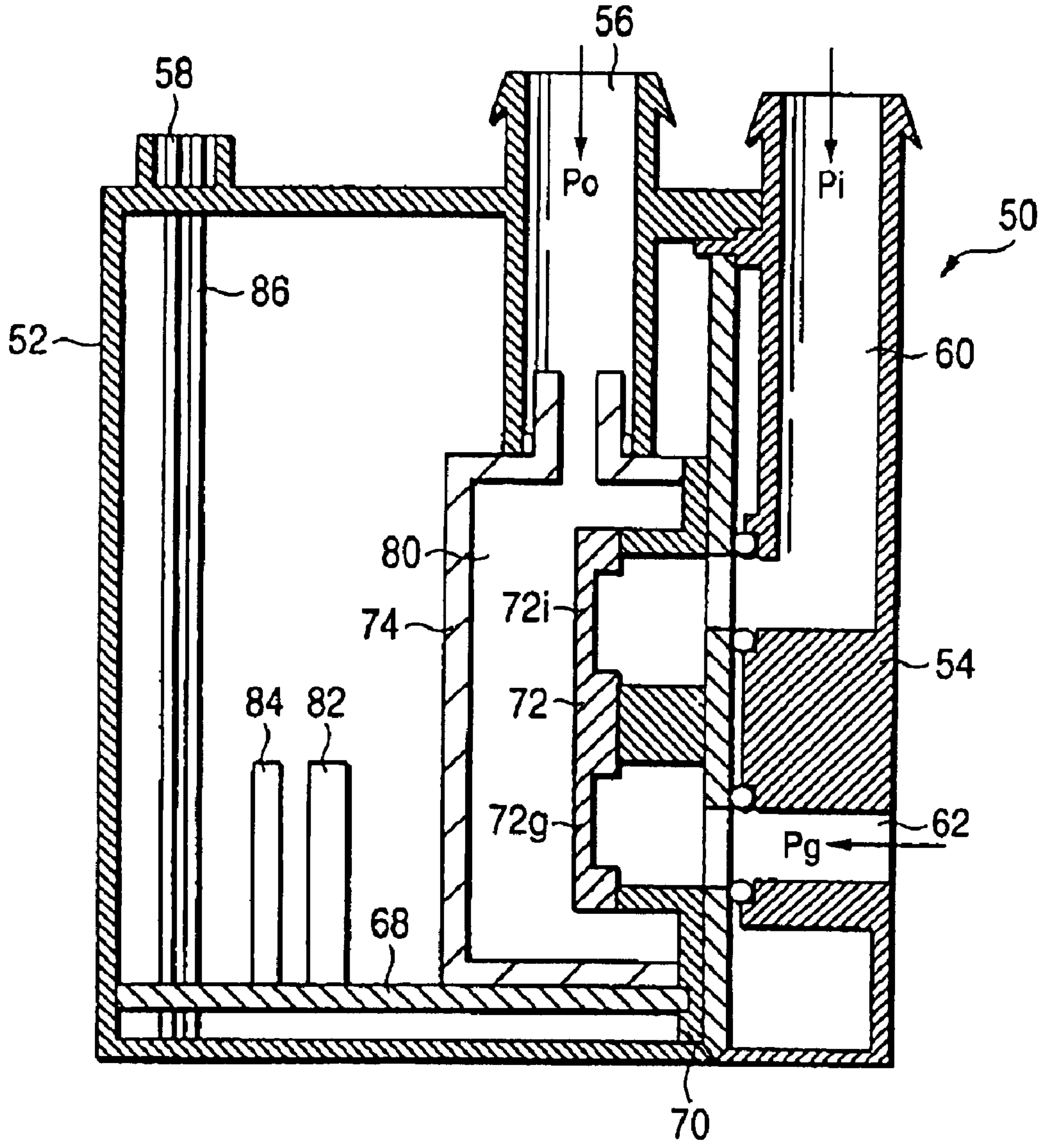
FIG. 4 is a sectional view taken along the line IV—IV in FIG. 3.

Embodiment 2 of the invention will be described below. FIG. 3 is a top view of a residual fuel detector of a fuel pump module according to Embodiment 2 of the invention. FIG. 4 is a sectional view taken along a line IV—IV in FIG. 3. Embodiment 2 is different from Embodiment 1 in shape and arrangement of the residual fuel detector 50, setting direction of the diaphragm 72, direction of the internal pressure lead-in pipe 60 and mount positions of the cap 74, the circuit portion 82, the circuit protecting portion 84 and the terminals 86. These points of difference will be described below. The other configuration of Embodiment 2 will be omitted since Embodiment 2 as to the other configuration is the same as Embodiment 1.

Referring to FIGS. 1, 3 and 4, the cover 52 and the base 54 are arched and arranged along the outer circumference of the fuel pump 14. According to the arrangement, the external shape of the fuel pump module 20 can be made small and the opening 10*a* of the fuel pump 10 can be made small. Incidentally, the same effect as described above can be obtained also in the case where the cover 52 and the base 54 are arranged along the outer circumference of another member other than the fuel pump 14, such as the high-pressure filter 18.

The diaphragm 72 is disposed along a direction of the depth of the fuel tank 10. The diaphragm 72*g* is disposed in a deeper position in the direction of the depth of the fuel tank 10 than the diaphragm 72*i*, that is, the diaphragm 72*g* is disposed in a position nearer the bottom portion 10*b* than the diaphragm 72*i*. Hence, in comparison with Embodiment 1, in Embodiment 2, the fuel 2 near the bottom portion 10*b* can be taken in so that the residual amount of fuel can be detected even in the case where the amount of the fuel 2 is small.

Moreover, since the external pressure lead-in portion 56 and the internal pressure lead-in portion 60 are disposed so that nipples thereof are extended upward from the fuel tank 10 (upward in FIGS. 1 and 4), the circumferential length of the residual fuel detector 50 (in a circumferential direction in FIG. 3 or in a lateral direction in FIG. 4) can be shortened as well as the external pressure lead-in pipe 42 and the internal pressure lead-in pipe 44 can be mounted easily. According to this configuration, Embodiment 2 is different from Embodiment 1 in the shape of the cap 74, particularly in the configuration of the portion where the external pressure lead-in portion 56 is press-fitted.

Moreover, since the connector 58 is disposed upward from the residual fuel detector 50 in the same manner as the external pressure lead-in portion 56 and the internal pressure lead-in portion 60, the mounting directions of the connector 58, the external pressure lead-in portion 56 and the internal pressure lead-in portion 60 are equalized to one another so that the connector 58, the external pressure lead-in portion 56 and the internal pressure lead-in portion 60 can be mounted easily.

Moreover, since the circuit portion 82, the circuit protecting portion 84, the external pressure lead-in portion 56 and the internal pressure lead-in portion 60 are disposed in the circumferential direction (in the circumferential direction in FIG. 3 or in the lateral direction in FIG. 4), the direction of the thickness of the residual fuel detector 50 (the radial direction in FIG. 3) can be reduced.

Embodiment 3

Figure 5:
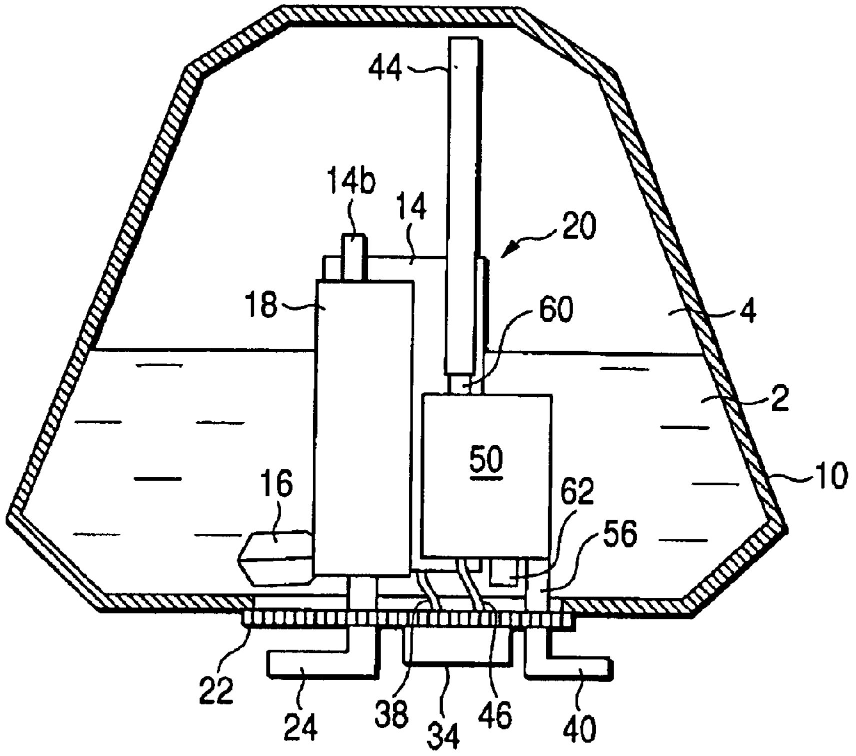
FIG. 5 is a partly sectional view showing a state in which a fuel pump module according to Embodiment 3 of the invention is mounted in a vehicle fuel tank.
Figure 6:
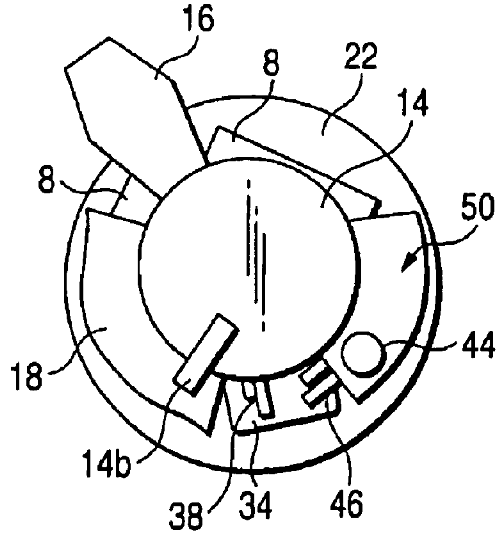
FIG. 6 is a top view showing a state in which the fuel pump module depicted in FIG. 5 is attached to a bracket.

Embodiment 3 of the invention will be described below. A case where the fuel pump module 20 is mounted in the fuel tank 10 from the bottom of the fuel tank 10, especially a case where the fuel pump module 20 is applied to a two-wheeled vehicle will be described in Embodiment 3. FIG. 5 is a partly sectional view showing a state in which the fuel pump module according to Embodiment 3 of the invention is mounted in the vehicle fuel tank. FIG. 6 is a top view showing a state in which the fuel pump module depicted in FIG. 5 is attached to a bracket. In FIGS. 5 and 6, corresponding parts are given the same reference numerals as those in Embodiment 1, and description thereof will be therefore omitted.

Referring to FIGS. 5 and 6, the fuel pump 14 is disposed in the fuel tank 10 shaped like approximately a trapezoid in section. The fuel pump 14 is fixed to a stay 8 having an end fixed to the bracket 22. The high-pressure filter 18 is also fixed to the stay 8. The residual fuel detector 50 is fixed to the bracket 22. Incidentally, the residual fuel detector 50 may be fixed to the high-pressure filter 18, the stay 8 or the fuel pump 14. Fuel 2 sucked in through the suction filter 16 by the actuation of the fuel pump 14 passes through inside of the fuel pump 14, a communication passage 14*b*, the high-pressure filter 18 and the fuel pipe 24 and is delivered to an internal combustion engine not shown.

The residual fuel detector 50 receives the external pressure Po, the internal pressure Pi and the fuel pressure Pg from the external air intake pipe 40, the internal pressure lead-in pipe 44 and the fuel pressure lead-in portion 62, respectively so as to detect the residual amount Ph of fuel and the in-tank pressure Pt in the same manner as in Embodiment 1.

As described above, the residual amount Ph of fuel and in-tank pressure Pt can be detected concurrently even in the case where the fuel tank 10 is complex or narrow in shape. In addition, since the residual fuel detector 50 is fixed to the bracket 22, the fuel pressure lead-inportion 62 can be provided near the bottom portion of the fuel tank 10 as well as the residual fuel detector 50 can be fixed easily. Hence, the residual amount of fuel can be detected even in the case where the residual amount of fuel is small.

As described above, the fuel pump module according to the invention includes: a bracket for blocking an opening of a vehicle fuel tank, which stores fuel,; a fuel pump held in the bracket directly or indirectly for sending out the fuel stored in the fuel tank; and a residual fuel detector for detecting the amount of fuel remaining in the fuel tank on the basis of external pressure Po of the fuel tank, internal pressure Pi of an air chamber of the fuel tank and fuel pressure Pg of the fuel with respective to the bracket, the kinds of pressure Po, Pi and Pg being received by a diaphragm. Hence, the fuel pump module is small-sized structurally to reduce limitation given to the fuel tank.

Further, the vehicle residual fuel detector according to the invention is provided on a bottom portion of a vehicle fuel tank, which stores fuel, and includes a diaphragm for receiving external pressure Po of the fuel tank, internal pressure Pi of an air chamber of the fuel tank and fuel pressure Pg of the fuel to thereby detect the amount of fuel remaining in the fuel tank and the internal pressure of the fuel tank. Hence, the vehicle residual fuel detector is small-sized structurally to reduce limitation given to the fuel tank.

What is claimed is:

1. A fuel pump module comprising:

a bracket for closing an opening of a vehicle fuel rank, which stores fuel;

a fuel pump held in the bracket for sending out the fuel stored in the fuel rank; and a residual fuel detector, wherein the residual fuel detector comprises a sectioned diaphragm that receives external pressure Po of the fuel tank via the bracket, internal pressure Pi of an air chamber of the fuel tank, and fuel pressure Pg of the fuel from the bracket to detect an amount of fuel remaining in the fuel tank.

2. The fuel pump module according to claim 1, wherein the residual fuel detector is disposed in a member holding the fuel pump, in proximity to a bottom portion of the fuel tank.

3. The fuel pump module according to claim 1, wherein the bracket is provided with a connector for connecting a signal line of the residual fuel detector.

4. A vehicle residual fuel detector disposed on a bottom portion of a vehicle fuel tank, which stores fuel, the vehicle residual fuel detector comprising a sectioned diaphragm for receiving external pressure Po of the fuel tank, internal pressure Pi of an air chamber of the fuel tank and fuel pressure Pg of the fuel to detect an amount of fuel remaining in the fuel tank and internal pressure of the fuel tank.

5. The vehicle residual fuel detector according to claim 4, wherein the diaphragm includes:

a first diaphragm section for detecting a difference between the external pressure Po and the fuel pressure Pg; and a second diaphragm section for detecting a difference between the external pressure Po and the internal pressure Pi; and wherein the first and second diaphragm sections are formed of one semiconductor chip.

6. The vehicle residual fuel detector according to claim 5, wherein the external pressure Po is supplied to front surface sides of the first and second diaphragm sections; and wherein the fuel pressure Pg and the internal pressure Pi are supplied to rear surface sides of the first and second diaphragm sections, respectively.

7. The vehicle residual fuel detector according to claim 5, wherein the internal pressure of the fuel tank is detected on the basis of an output of the second diaphragm section.

8. The vehicle residual fuel detector according to claim 4, further comprising:

a monolithic IC in which the diaphragm and a circuit portion for processing an output signal of the diaphragm are formed on one chip; and a bipolar IC in which a protection circuit for protecting circuits contained in the monolithic IC is formed.

9. The vehicle residual fuel detector according to claim 4, further comprising:

an external pressure lead-in portion for leading the external pressure Po into the residual fuel detector; and an internal pressure lead-in portion for leading the internal pressure Pi into the residual fuel detector, wherein the external pressure lead-in portion and the internal pressure lead-in portion are formed as pipes extended in a direction of depth of the fuel tank.

10. The vehicle residual fuel detector according to claim 4, wherein a portion of the diaphragm for receiving the fuel pressure Pg is formed to be nearer the bottom portion of the fuel tank than another portion of the diaphragm for receiving the internal pressure Pi.

11. The fuel pump module according to claim 3, wherein said connector is connected to an external signal processing circuit and an external power supply circuit.

12. The fuel pump module according to claim 1, wherein a residual amount of fuel and an in-tank pressure can be detected concurrently.

* * * * *